(12) United States Patent
Cheng

(10) Patent No.: US 11,650,454 B2
(45) Date of Patent: May 16, 2023

(54) BACKLIGHT MODULE HAVING OPTICAL FILM WITH DEFLECTIVE MICROSTRUCTURES

(71) Applicant: Sunrise Optronics Co., Ltd, Taoyuan (TW)

(72) Inventor: Wen-Feng Cheng, Taoyuan (TW)

( * ) Notice: Subject to any disclaimer, the term of this patent is extended or adjusted under 35 U.S.C. 154(b) by 0 days.

(21) Appl. No.: 17/357,945

(22) Filed: Jun. 24, 2021

(65) Prior Publication Data
US 2022/0252937 A1    Aug. 11, 2022

(30) Foreign Application Priority Data

Feb. 9, 2021  (TW) ................................. 110105143

(51) Int. Cl.
G02F 1/13357    (2006.01)
G02F 1/1335    (2006.01)

(52) U.S. Cl.
CPC .. G02F 1/133603 (2013.01); G02F 1/133607 (2021.01)

(58) Field of Classification Search
None
See application file for complete search history.

(56) References Cited

U.S. PATENT DOCUMENTS

| | | |
|---|---|---|
| 8,011,802 B2 | 9/2011 | Hoshi |
| 9,341,754 B2 | 5/2016 | Maekawa et al. |
| 2007/0024994 A1 | 2/2007 | Whitney et al. |
| 2010/0033957 A1 | 2/2010 | Lin |
| 2011/0205734 A1 | 8/2011 | Yamakita et al. |
| 2012/0176772 A1 | 7/2012 | Maekawa et al. |
| 2020/0174317 A1 | 6/2020 | Chang |
| 2021/0286215 A1* | 9/2021 | Jang ................. G02F 1/133606 |

FOREIGN PATENT DOCUMENTS

| | | |
|---|---|---|
| CN | 101620283 A | 1/2010 |
| TW | I422783 B | 1/2014 |

\* cited by examiner

*Primary Examiner* — Richard H Kim

(57) ABSTRACT

A backlight module is provided. The backlight module includes a substrate; a plurality of light-emitting elements, disposed on the substrate along a first direction and a second direction; and at least one optical film, including: a first surface, having a plurality of cone structures, top points of the cone structures being arranged to form a plurality of first ridges. In addition, an angle is between the first ridge and the first direction; and a second surface, corresponding to the first surface and toward the substrate, the plurality of light-emitting elements being between the substrate and the second surface.

9 Claims, 18 Drawing Sheets

BACKLIGHT MODULE HAVING OPTICAL FILM WITH DEFLECTIVE MICROSTRUCTURES

BACKGROUND OF THE INVENTION

1. Field of the Invention

The present invention is in related to a backlight module, more particularly to the backlight module applied to the field of display.

2. Description of the Prior Art

Backlight module is a major portion to the present LCD display, and has many light-emitting elements in order to be assembled for an LCD screen. To approach more average light illumination and the quality of the LCD screen, installing a diffuser plate in the direct-lit backlight module is the present application. Since the diffuser plate has textures, physical phenomena such as light refraction, reflection or scattering can then be applied to make the light illumination more evenly distributed.

To promote the contrast of the LCD display, Mini LED is gradually a major role for being a light-emitting element in the field of backlight module to be instead of regular LED. Compared to the diffusion plate in prior arts, Mini LED is able to more effectively and averagely distribute light illumination. Regarding FIG. 1A to FIG. 1F, which illustrate a schematic view of a backlight module, a schematic view of an optical film without deflective microstructures in prior arts, a schematic optical illumination distribution simulation view in prior arts, a schematic 3-D view of the optical film without deflective microstructures in prior arts, a schematic view of an optical film without deflective arc arched structures in prior arts, and a schematic optical illumination distribution simulation view. Such backlight module 10 has a substrate 11, a plurality of Mini LEDs 12 and a plurality of prior optical films 13 without deflective microstructures. A plurality of microstructures 14 of the prior optical film 13 without deflective microstructures are arranged corresponding to the Mini LEDs 12.

FIG. 1F is the schematic optical illumination distribution simulation view, which is made by assembling four adjacent Mini LEDs 12 and then be simulated. Further to FIG. 1C, which is a light illumination distribution view produced by an A-A section line in FIG. 1F. Since the Mini LEDs 12 are disposed between point −2 and point −1 and between point 1 and point 2 along the horizontal axis in FIG. 1C, it can be seen that the lighter illumination areas are all around where the Mini LEDs 12 are. Therefore, the performance of light illumination is worse.

As it can be seen, how to solve aforesaid shortcoming becomes an important issue to persons who are skilled in the art.

SUMMARY OF THE INVENTION

The first objective of the present invention is to provide a backlight module that has a plurality of diffusion plates with deflective microstructures, so as to improve the performance of light diffusion.

A backlight module, comprises that of: a substrate; a plurality of light-emitting elements, disposed on the substrate along a first direction and a second direction; and at least one optical film, comprising: a first surface, having a plurality of cone structures, top points of the cone structures being arranged to form a plurality of first ridges, wherein an angle is between the first ridge and the first direction; and a second surface, corresponding to the first surface and toward the substrate, the plurality of light-emitting elements being between the substrate and the second surface; wherein a distance is defined between the light-emitting element and the other light-emitting element that is adjacent to the light-emitting element along the first direction (e.g. X-axis), and a distance is defined between the light-emitting element and the other light-emitting element along the second direction (e.g. Y-axis), hence a range of the angle is as that of:

$$\left(\tan^{-1}\frac{Y}{X}\right) - 10° \leq \theta \leq \left(\tan^{-1}\frac{Y}{X}\right) + 10°.$$

Preferably, the angle is defined as that of:

$$\theta = \tan^{-1}\frac{Y}{X}$$

Preferably, the cone structure is a quadrangular pyramid recessed toward the substrate.

Preferably, the cone structure is a polygonal pyramid recessed toward the substrate.

Preferably, the second surface further comprises a plurality of arc arched structures, top portions of the arc arched structures being arranged to form a plurality of second ridges, the angle being between the second ridge and the first direction.

Preferably, the backlight module further comprises at least one prism sheet that is above the optical film.

Preferably, the light-emitting element is a Mini LED.

Preferably, a thickness of the optical film is between 0.05 to 0.5 mm.

Preferably, a material of the optical film is selected from the group consisting of: polycarbonate (PC), polymethyl methacrylate (PMMA), polyethylene terephthalate (PET), and stacked composite material of PC, PMMA and PET.

The present invention increases light performance, even the density of the light-emitting elements is reduced, which means the cost is lower down.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

In order to describe in detail the technical content, structural features, achieved objectives and effects of the instant application, the following detailed descriptions are given in conjunction with the drawings and specific embodiments. It should be understood that these embodiments are only used to illustrate the application and not to limit the scope of the instant application.

The present invention discloses a backlight module, wherein an optical film of the backlight module is a microstructure that corresponds to a Mini LED array, and there is a special angle relationship between the optical film and the Mini LED array. Therefore, the diffusion of the Mini LED array is improved, so as to promote illumination performance.

Figure 3B:
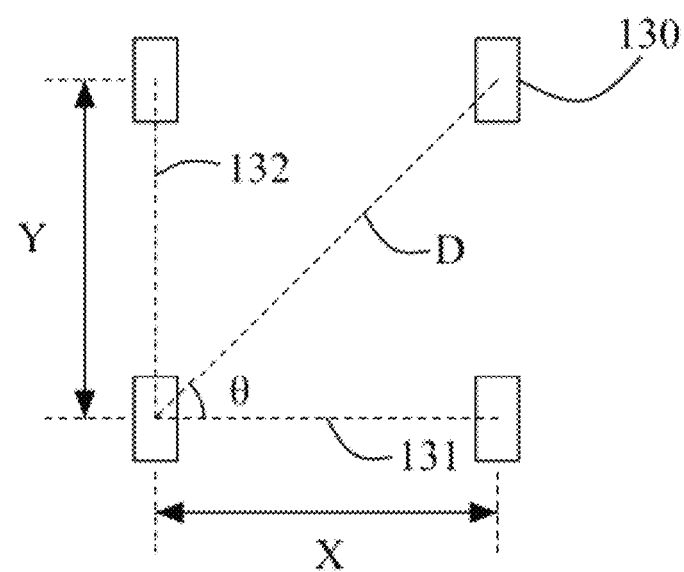
Figure 4A:
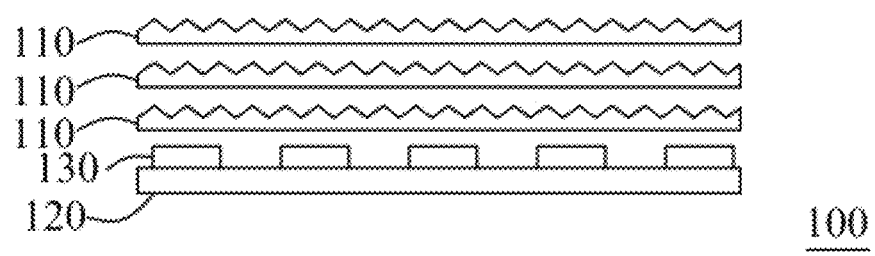
FIG. 4A illustrates a schematic view of the first preferred embodiment of the backlight module of the present invention.

With reference to FIG. 4A, which illustrates a schematic view of a first preferred embodiment of a backlight module of the present invention. As shown in FIG. 4A, a light module 100 includes a substrate 120, a plurality of light-emitting elements 130 and a plurality of optical films 110. The light-emitting elements 130 are disposed on the substrate 120 along a first direction 131 and a second direction 132, wherein the substrate 120 is a flexible substrate as an example. Referring to FIG. 3B, which illustrates a schematic view of a deflection of a cone structure of the present invention. According to FIG. 3B, the light-emitting elements 130 are arranged along the first direction 131 and the second direction 132 respectively, and the first direction 131 is perpendicular to the second direction 132.

For the first preferred embodiment, if the light-emitting element 130 is an LED, which prefers a Mini LED. The optical films 110 are above the light-emitting elements 130. Preferably, the thickness of the optical film 110 is between 0.05 to 0.5 mm, and the number of the optical films 110 are 3 to 5. In addition, the material of the optical film 110 is polycarbonate (PC), polymethyl methacrylate (PMMA), polyethylene terephthalate (PET), or stacked composite material of PC, PMMA and PET.

Figure 2A:
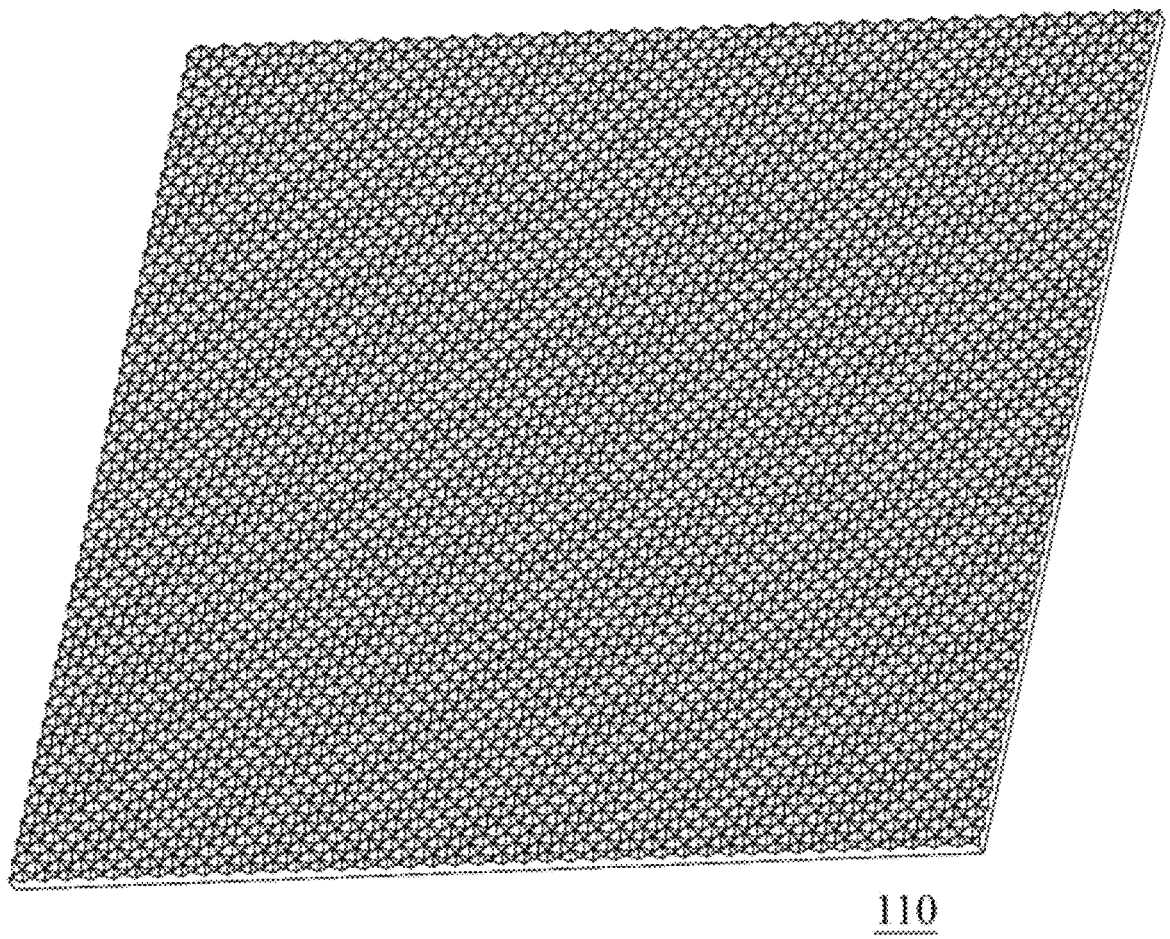
FIG. 2A illustrates a schematic view of an embodiment of the optical film of the present invention.
Figure 2B:
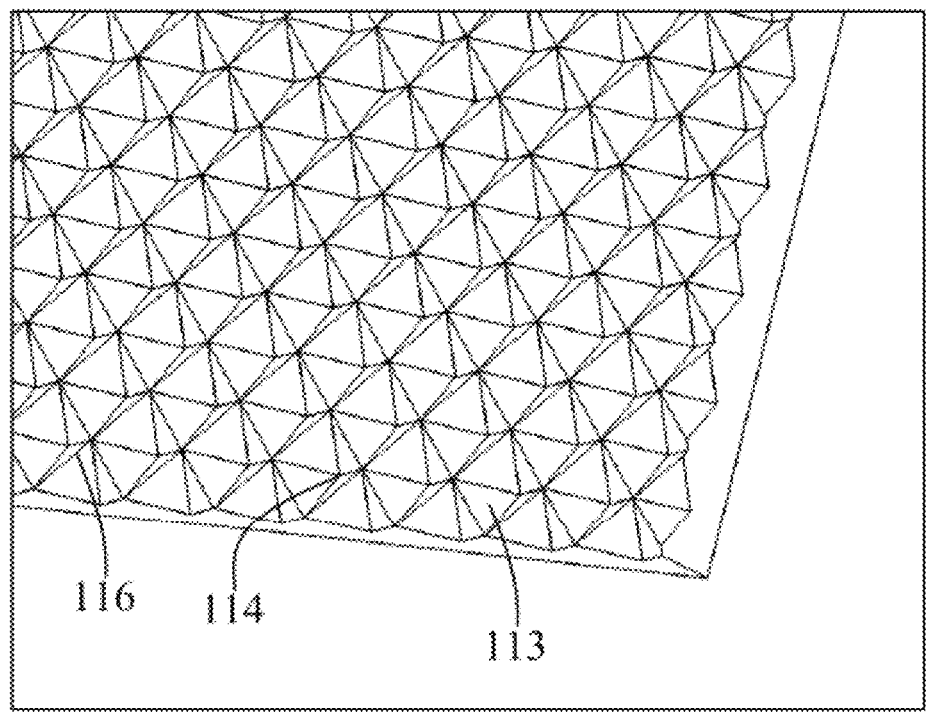
FIG. 2B illustrates a schematic partial amplified view of the embodiment of the optical film of the present invention.
Figure 2C:
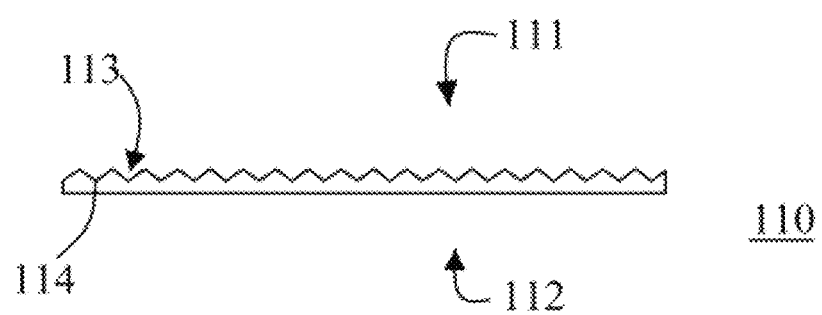
FIG. 2C illustrates a schematic lateral view of the embodiment of the optical film of the present invention.

Please refer FIG. 2A to FIG. 2C, which illustrate a schematic view of an embodiment of the optical film of the present invention, a schematic partial amplified view of the embodiment of the optical film of the present invention and a schematic lateral view of the embodiment of the optical film of the present invention. The optical film 110 includes a first surface 111 and a second surface 112, which are corresponding to each other. As shown in FIG. 2C and FIG. 4A, the second surface 112 faces to the light-emitting elements 130.

The first surface 111 of the optical film 110 further includes a plurality of cone structures 113. Each cone structure 113 has a top point 114 that elongates toward the second surface 112. In other words, the cone structure 113 is further a quadrangular pyramid recessed toward the substrate 120 and formed on the first surface 111. The top points 114 of the cone structures 113 are arranged to formed a plurality of first ridges 116, wherein an angle θ is between the first ridge 116 and the first direction 131.

Figure 3A:
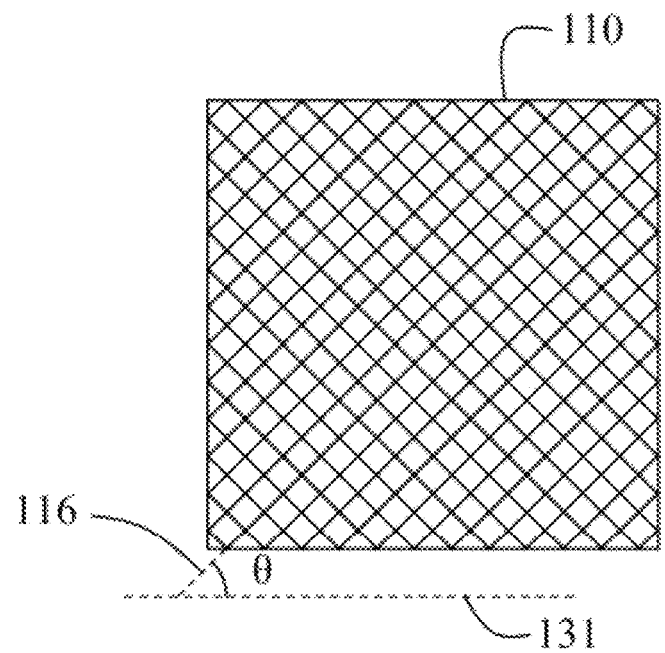
FIG. 3A and FIG. 3B illustrate schematic views of the deflection of the cone structure of the present invention.

Referring to FIG. 3A to FIG. 3B, which illustrate schematic views of the deflection of the cone structure of the present invention. There is a deflection angle between the arrangements of the cone structures 113 and the light-emitting elements 130. As shown in FIG. 3A, the cone structure 113 is a quadrangular pyramid, but without the top point 114 for purifying the figure. The edges of the cone structure 113 are arranged to form the plurality of first ridges 116, and an angle θ is between the first ridge 116 and the first direction 131 (shown as a dot line).

Please continuously refer to FIG. 3B, the angle θ is determined by the arrangement of the light-emitting elements 130. That is, the angle between one of the light-emitting elements 130 and the oblique-angle light-emitting element 130 is taken as the angle θ. Further definitions, the tangent function of the angle θ is equal to a distance Y between the two light-emitting elements 130 along the second direction 132 divided by a distance X between the two light-emitting elements 130 along the first direction 131. The equation is $$\tan\theta = \frac{Y}{X}.$$

Hence, the deflection angle θ of the cone structure 113 is in relationship to the arrangement of the light-emitting element 130.

Continuously, the angle θ is equal to the arctangent function of the distance Y between the two light-emitting elements 130 along the second direction 132 divided by the distance X between the two light-emitting elements 130 along the first direction 131. The equation is $$\theta = \tan^{-1}\frac{Y}{X}.$$

The angle θ is in a certain range of tolerance. A preferred tolerance is ±10°, which means θ±10°. Frankly speaking, the range of the angle θ is represented by the following equation:

$$\left(\tan^{-1}\frac{Y}{X}\right) - 10° \le \theta \le \left(\tan^{-1}\frac{Y}{X}\right) + 10°$$

Figure 3C:
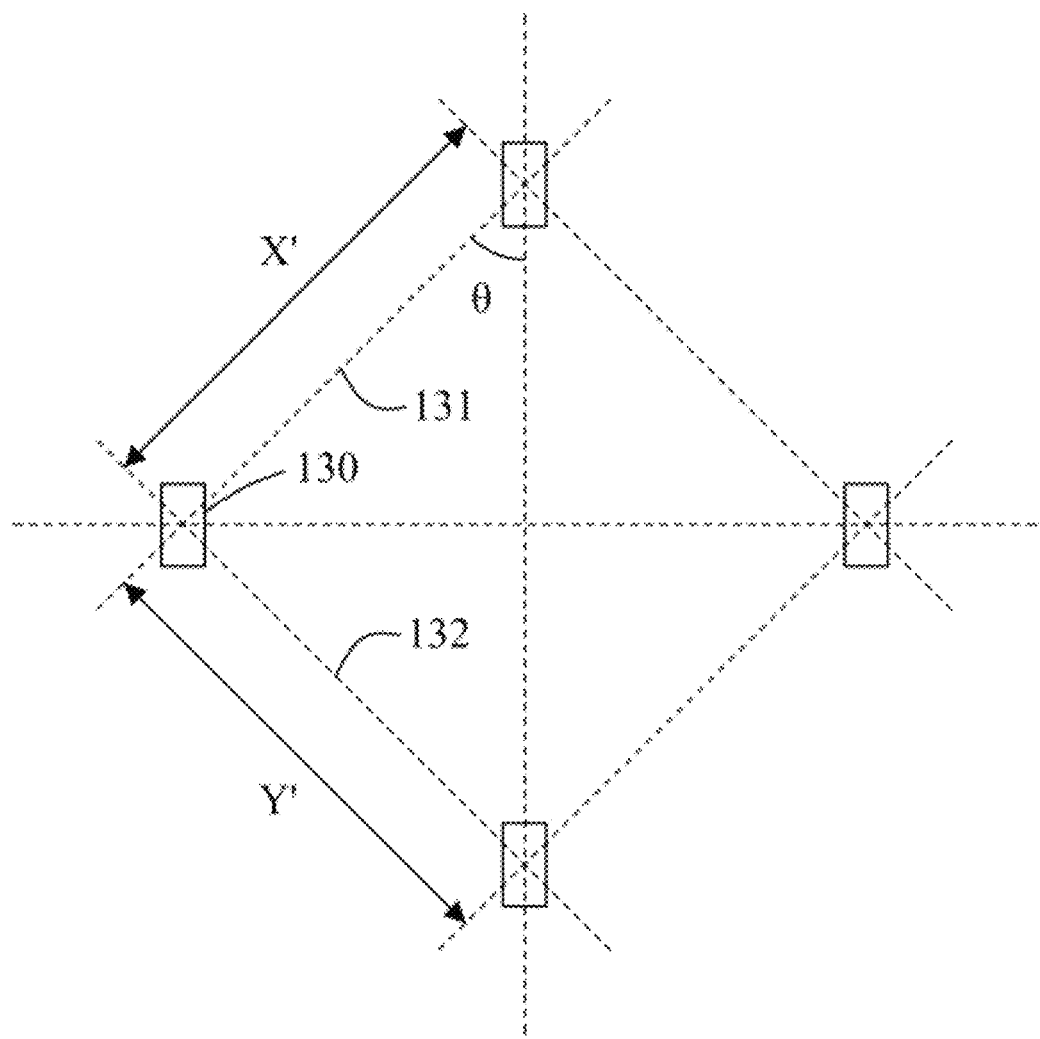
FIG. 3C illustrates a schematic view of another arrangement of the light-emitting elements of the present invention.

As shown in FIG. 3C, which illustrates a schematic view of another arrangement of the light-emitting elements of the present invention. The light-emitting elements 130 are arranged in a diamond-shaped array. In the present embodiment, the light-emitting elements 130 are still arranged along the first direction 131 and the second direction 132 respectively. The angle θ is still defined by a distance Y' between the two light-emitting elements 130 along the second direction 132 and a distance X' between the two light-emitting elements 130 along the first direction 131, that is, $$\theta = \tan^{-1}\frac{Y'}{X'}.$$

In another word, an angle θ is between the first ridge 116 of the cone structures 113 of the optical film 110 and the arrangement of the light-emitting elements 130 as always.

Figure 1A:
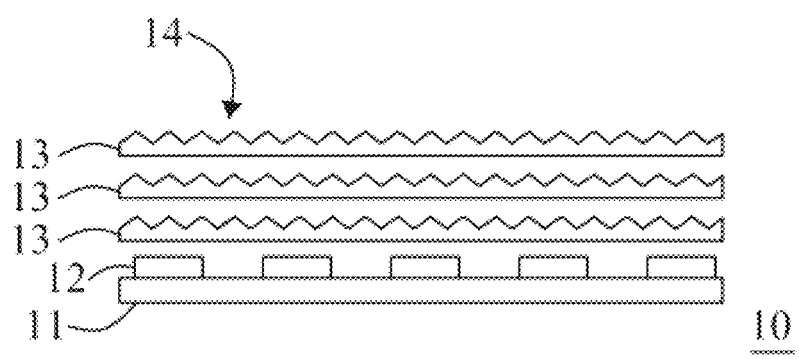
FIG. 1A illustrates a schematic view of a backlight module.
Figure 1B:
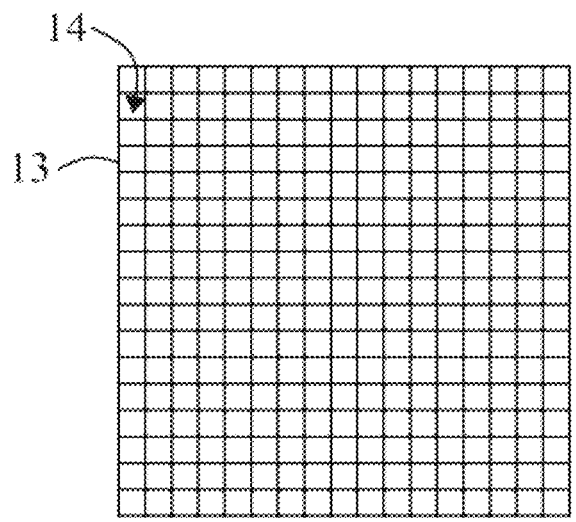
FIG. 1B illustrates a schematic view of an optical film without deflective microstructures in prior arts.
Figure 1C:
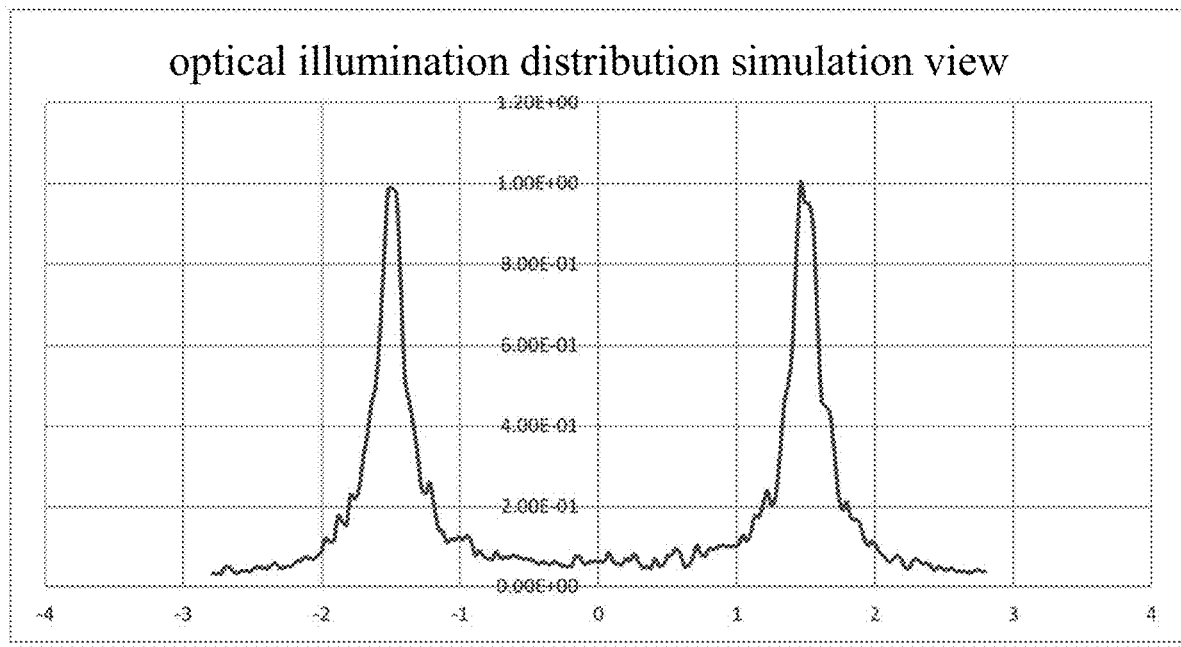
FIG. 1C illustrates a schematic optical illumination distribution simulation view in prior arts.
Figure 4B:
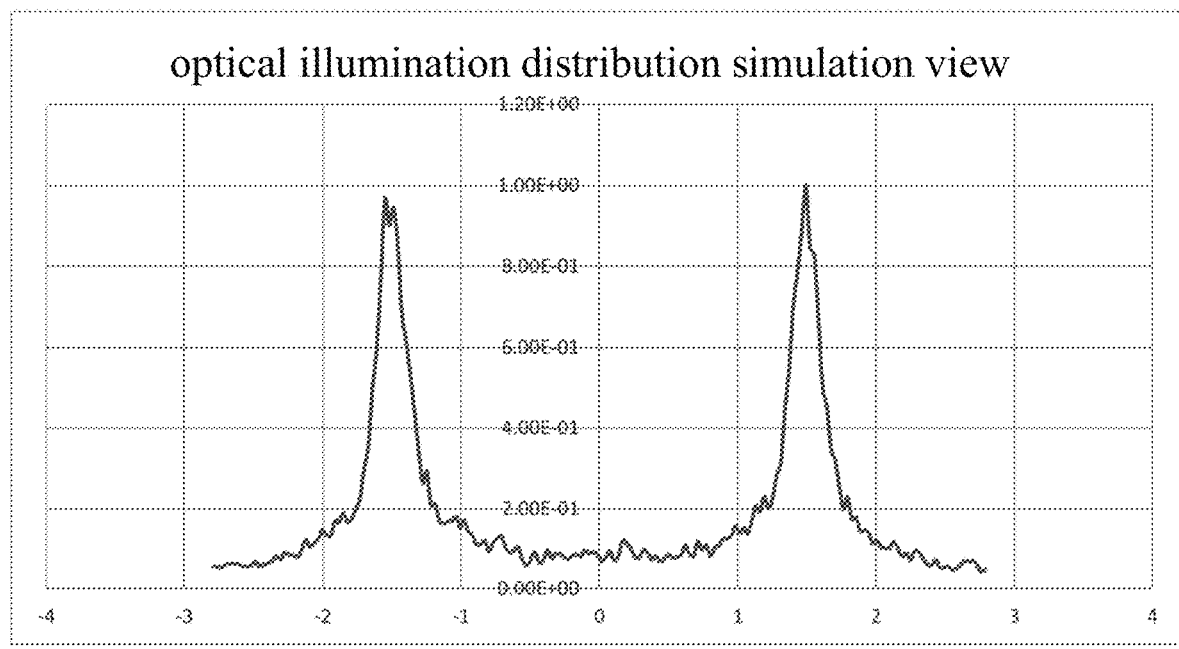
FIG. 4B illustrates a schematic optical illumination distribution simulation view of the first preferred embodiment of the backlight module of the present invention.

With reference to FIG. 4A and FIG. 4B, which illustrate a schematic view of the first preferred embodiment of the backlight module of the present invention and a schematic optical illumination distribution simulation view of the first preferred embodiment of the backlight module of the present invention. The backlight module 100 includes three optical films 110 and the deflective cone structures 113. Compared to FIG. 1C, which illustrates a schematic optical illumination distribution simulation view in prior arts, a lot more distributed light points are in the central area of FIG. 4B. It represents that the optical film 110 has improved the diffusion of the light-emitting elements 130.

Figure 5A:
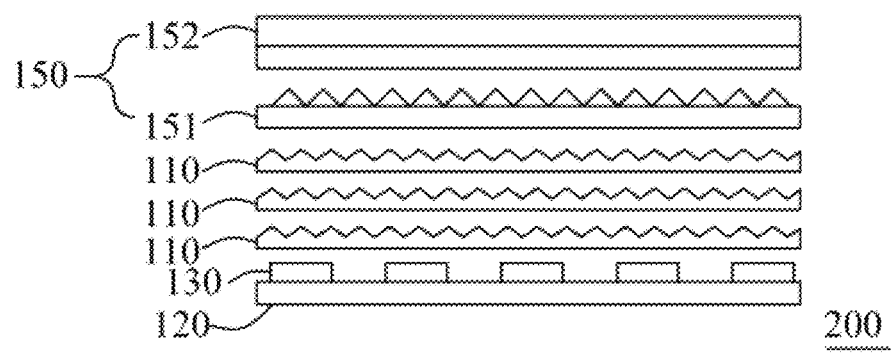
FIG. 5A illustrates a schematic view of a second preferred embodiment of the backlight module of the present invention.

According to FIG. 5A, which illustrates a schematic view of a second preferred embodiment of the backlight module of the present invention. A backlight module 200 of the second preferred embodiment adopts a prism sheet set 150 above the optical films 110. The prism sheet set 150 includes a first prism sheet 151 and a second prism sheet 152, wherein the arrangements of the first prism sheet 151 and the second prism sheet 152 are perpendicular to each other. Specifically, there are directional microstructures disposed on the first prism sheet 151 and the second prism sheet 152 respectively, and the two directional microstructures are perpendicular to one another.

Figure 1D:
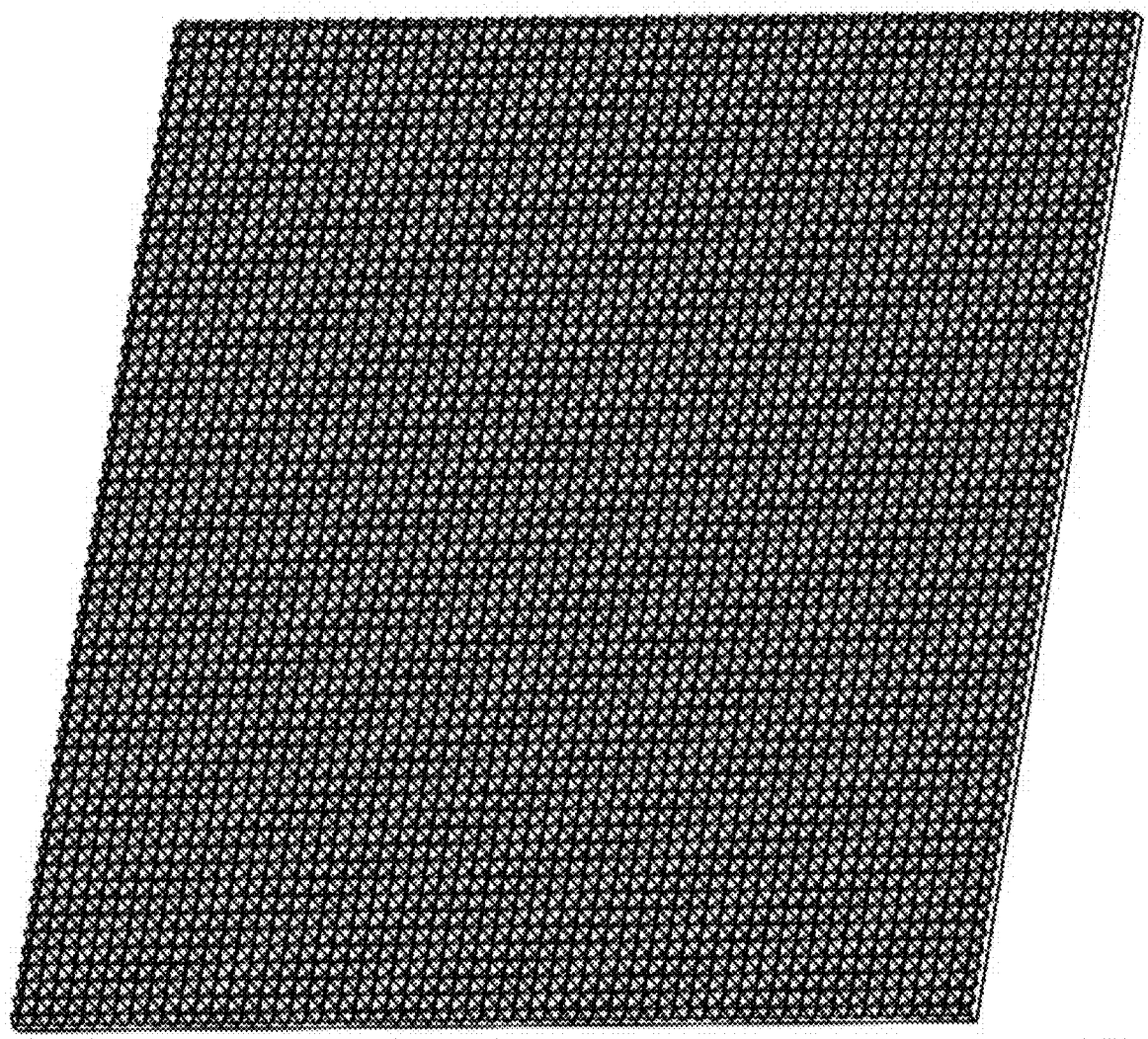
FIG. 1D illustrates a schematic 3-D view of the optical film without deflective microstructures in prior arts.
Figure 5B:
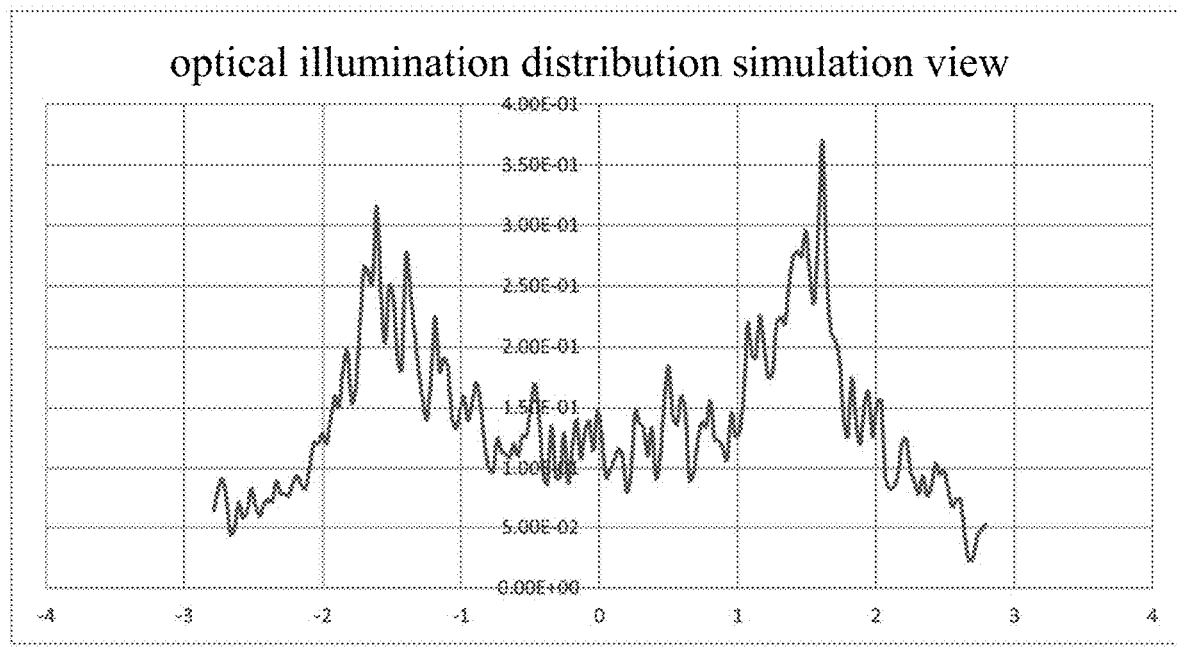
FIG. 5B illustrates a schematic optical illumination distribution simulation view of a backlight module with a prism sheet set but without a deflective microstructure in prior arts.
Figure 5C:
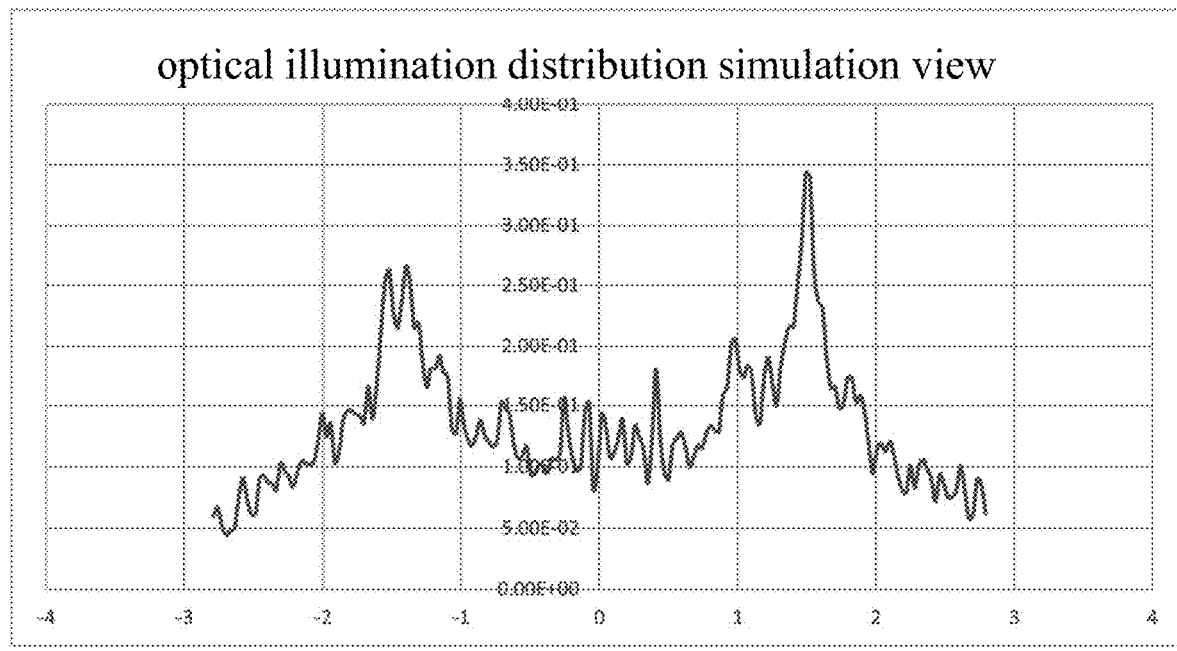
FIG. 5C illustrates a schematic optical illumination distribution simulation view of the second preferred embodiment of the backlight module of the present invention.

Then, go to FIG. 5B and FIG. 5C, which illustrate a schematic optical illumination distribution simulation view of a backlight module with a prism sheet set but without a deflective microstructure in prior arts, and a schematic optical illumination distribution simulation view of the second preferred embodiment of the backlight module of the present invention. FIG. 5B adopts the backlight module 200 as a base technology to install an optical film 13 without deflective structure, as shown in FIG. 1D, to be instead of the optical film 110. Compared to FIG. 5B and FIG. 5C, high illumination areas in FIG. 5B are less, and are distributed between point −2 and point −1 and between point 1 and point 2 along the horizontal axis; on the contrary, FIG. 5C has obviously spread high illumination areas, and light effectively spreads to the central area, which is between point −1 and point 1.

Figure 6A:
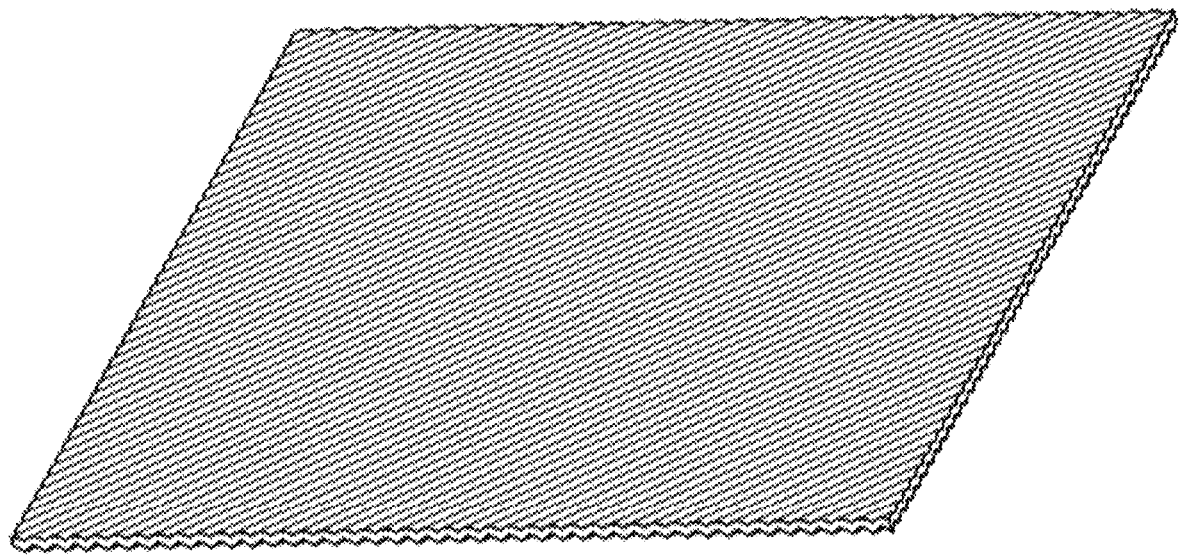
FIG. 6A illustrates a schematic back view of another embodiment of the optical film of the present invention.
Figure 6B:
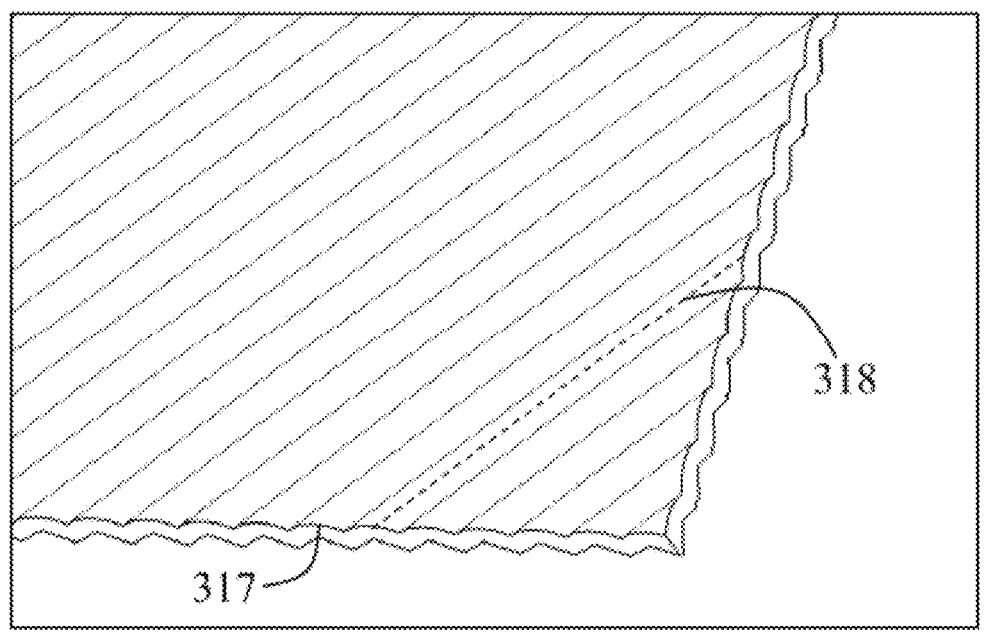
FIG. 6B illustrates a schematic back partial amplified view of the embodiment of the optical film of the present invention.
Figure 6C:
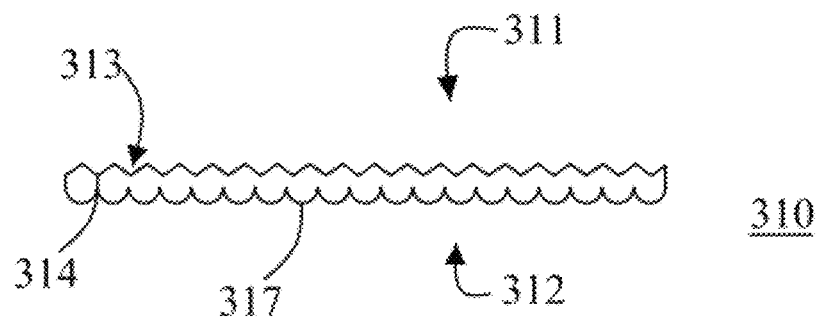
FIG. 6C illustrates a schematic lateral view of the embodiment of the optical film of the present invention.
Figure 6D:
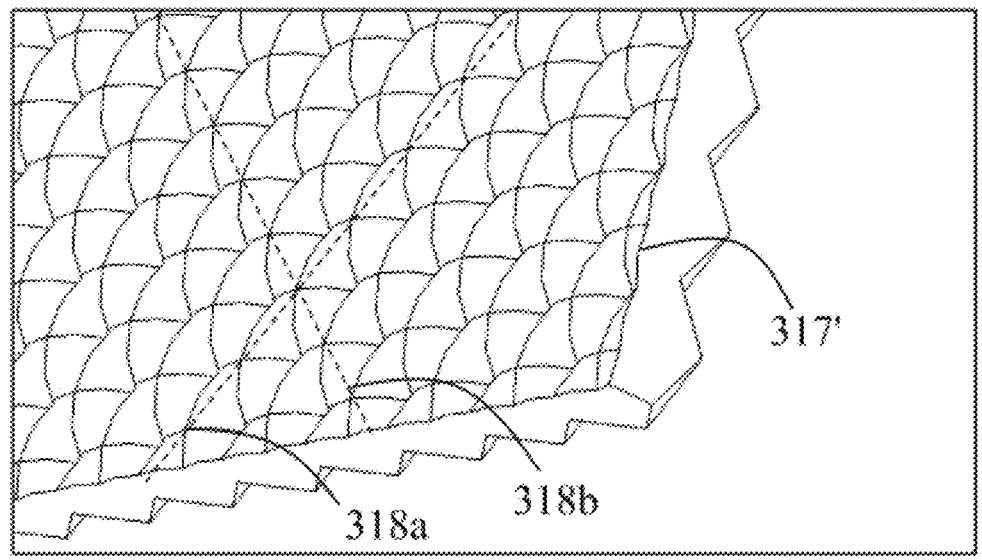
FIG. 6D illustrates a schematic view of another embodiment of the arc arched structure of the present invention.

With reference to FIG. 6A to FIG. 6C, which illustrate a schematic back view of another embodiment of the optical film of the present invention, a schematic back partial amplified view of the embodiment of the optical film of the present invention and a schematic lateral view of the embodiment of the optical film of the present invention. For the embodiment, an optical film 310 includes a first surface 311 and a second surface 312. The first surface 311 includes a plurality of cone structures 313, and the cone structures 313 are the same as FIG. 2C's, it will not be described any further hereinafter. The second surface 312 further includes a plurality of arc arched structures 317, and every single arc arched structure 317 is a lenticular. Top portions of the arc arched structures 317 are arranged to form a plurality of second ridges 318. The angle θ is between the second ridge 318 and the light-emitting elements 130 along the first direction. Frankly speaking, the direction for arranging the arc arched structures 317 is the same as the direction for arranging the cone structures 313 on the first surface 311. Referring to FIG. 6D, which illustrates a schematic view of another embodiment of the arc arched structure of the present invention. The arc arched structure 317' is a curved surface which is constructed by a plurality of arc arched structures toward different directions. Hence, there are two second ridges 318a, 318b, which means two arc arched structures toward two different directions. The two second ridges 318a, 318b are perpendicular to each other. Further, an angle θ is between the second ridge 318a and the first direction 131.

Figure 1E:
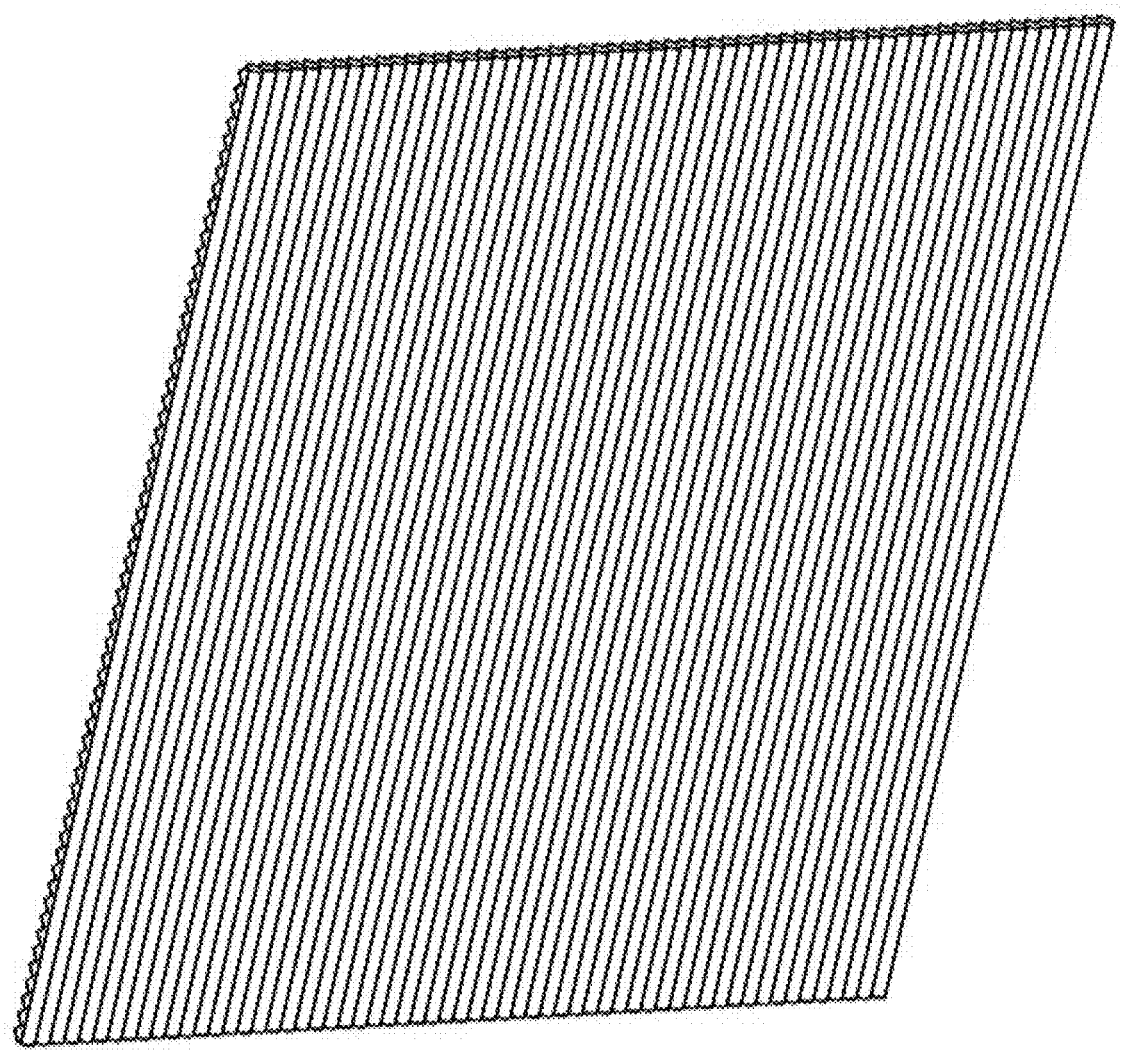
FIG. 1E illustrates a schematic view of an optical film without deflective arc arched structures in prior arts.
Figure 1F:
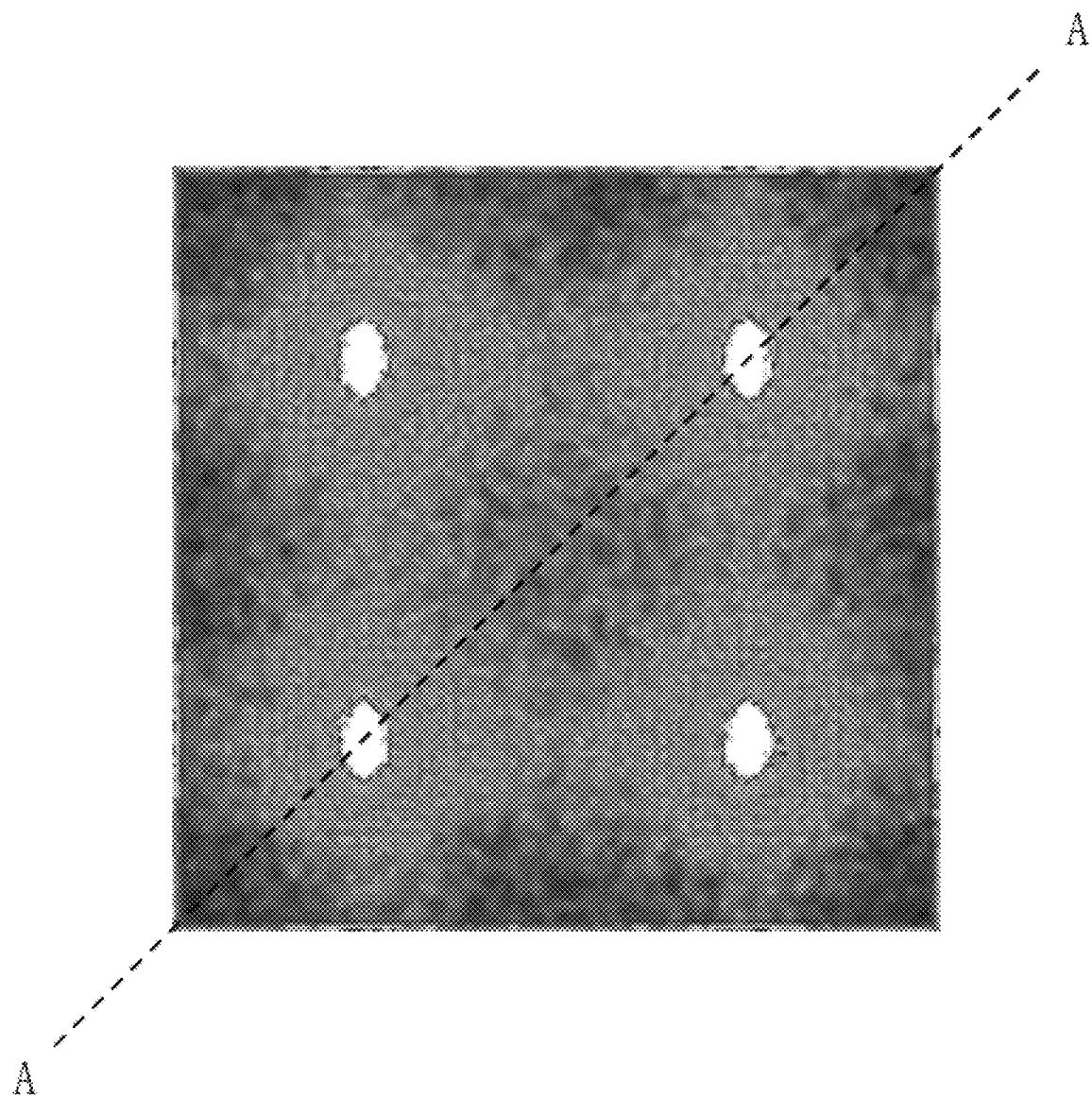
FIG. 1F illustrates a schematic optical illumination distribution simulation view.

As shown in FIG. 1E, which illustrates a schematic view of an optical film without deflective arc arched structures in prior arts. As shown in FIG. 6A, a deflective angle θ is existed between each arc arched structure 317 and each first direction 131 arranged by the light-emitting elements 130; comparatively, the arc arched structures of the optical film 13' in FIG. 1E are parallel to one another.

Figure 7A:
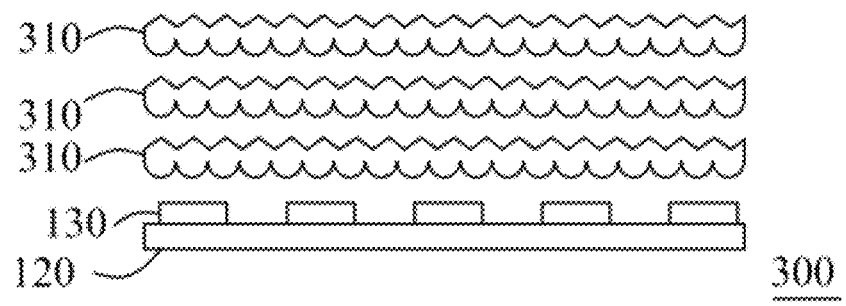
FIG. 7A illustrates a schematic view of a third preferred embodiment of the backlight module of the present invention.

Referring to FIG. 7A, which illustrates a schematic view of a third preferred embodiment of the backlight module of the present invention. A backlight module 300 includes a plurality of optical films 310 disposed above the light-emitting elements 130, wherein the arc arched structures 317 of the optical film 310 are formed toward the light-emitting elements 130.

Figure 7B:
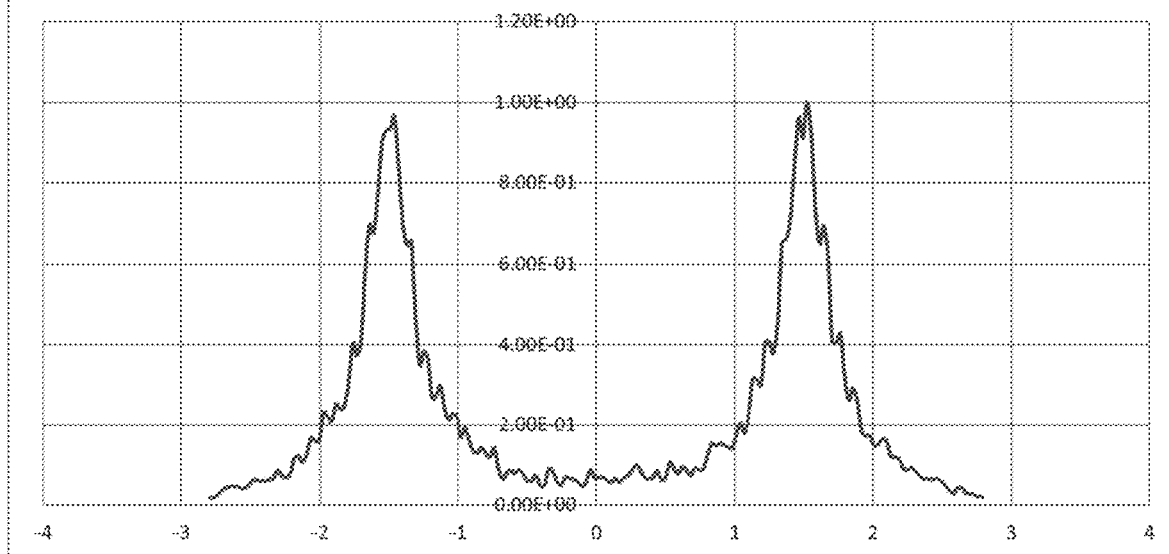
FIG. 7B illustrates a schematic optical illumination distribution simulation view of the optical film without deflective microstructures.
Figure 7C:
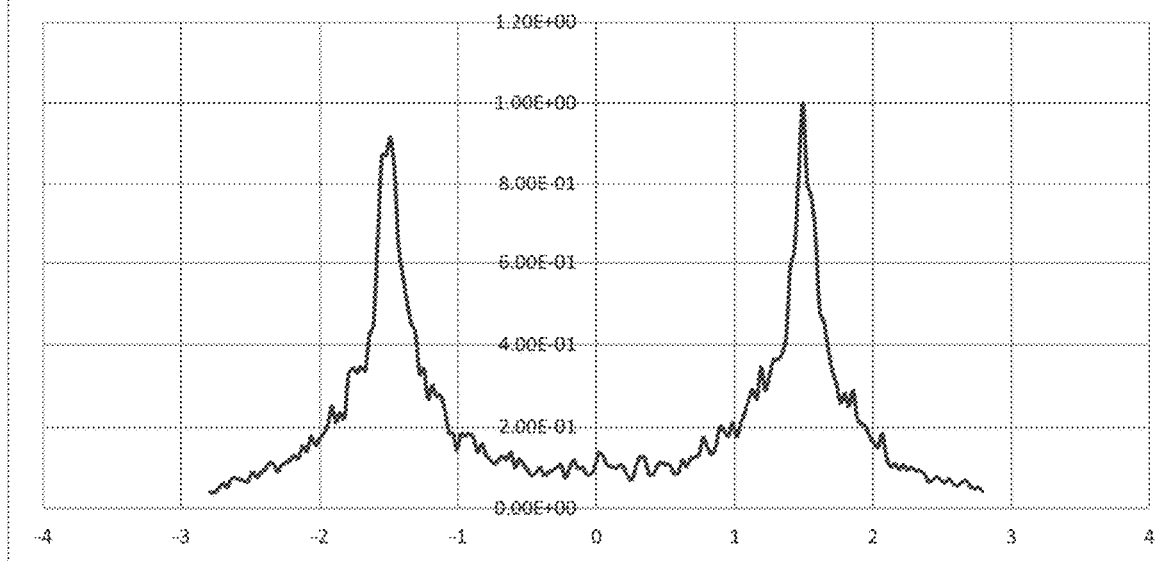
FIG. 7C illustrates a schematic optical illumination distribution simulation view of the third preferred embodiment of the backlight module of the present invention.

Please refer to FIG. 7B and FIG. 7C, which illustrate a schematic optical illumination distribution simulation view of the optical film without deflective microstructures and a schematic optical illumination distribution simulation view of the third preferred embodiment of the backlight module of the present invention. As shown in FIG. 7B, which adopts the backlight module 300 as a basic technology to install an optical film 13' without deflective arc arched structures, as shown in FIG. 1E, to be instead of the optical film 310, so as to produce such optical illumination distribution simulation view. It can be seen that the high illumination areas are distributed on two sides in FIG. 7B, and the central area is obviously darker. According to FIG. 7C, the light distribution is more average after deflecting the cone structures 113 and the arc arched structures 317, so as to compensate the dark central area.

Figure 8A:
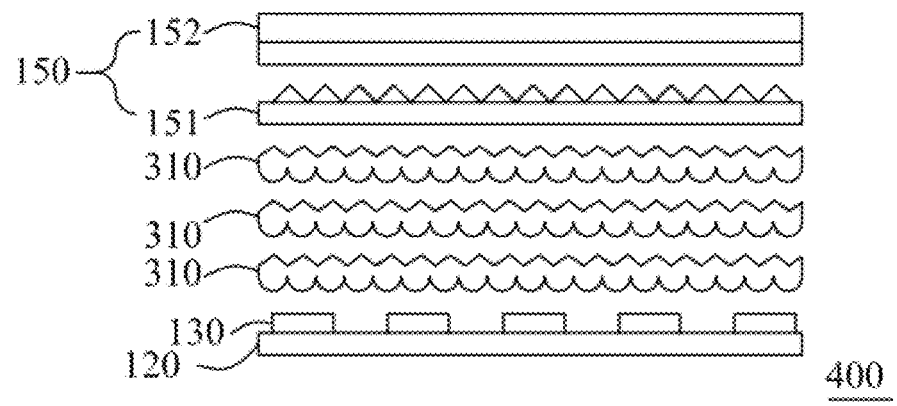
FIG. 8A illustrates a schematic view of a fourth preferred embodiment of the backlight module of the present invention.
Figure 8B:
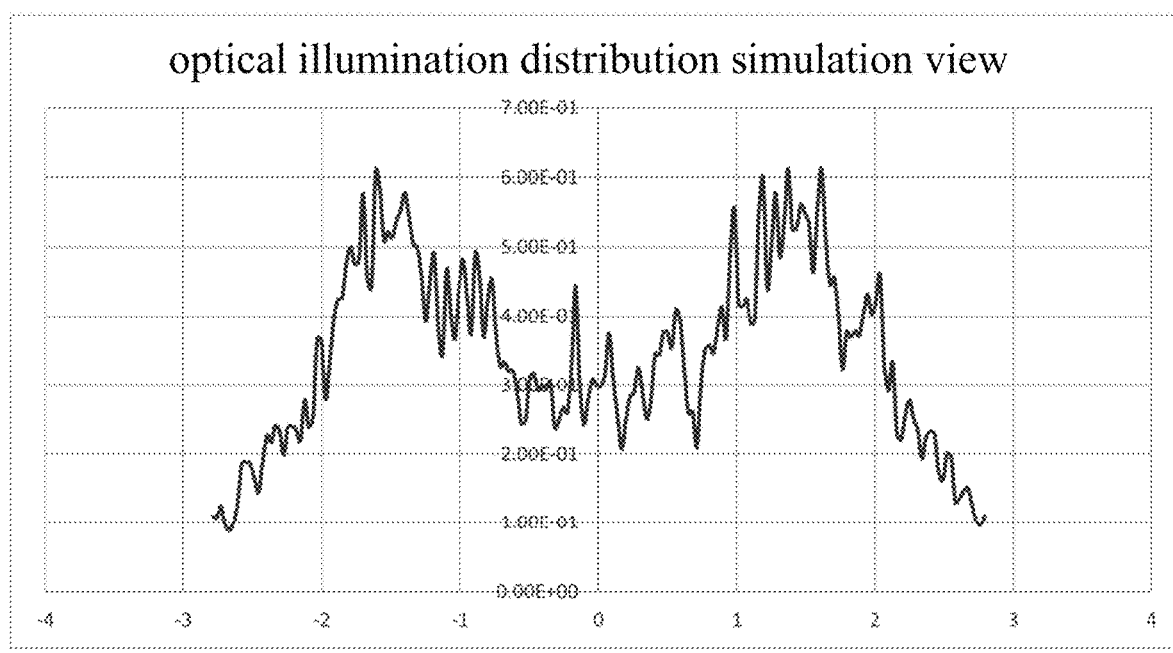
FIG. 8B illustrates a schematic optical illumination distribution simulation view of the backlight module without deflective microstructures.
Figure 8C:
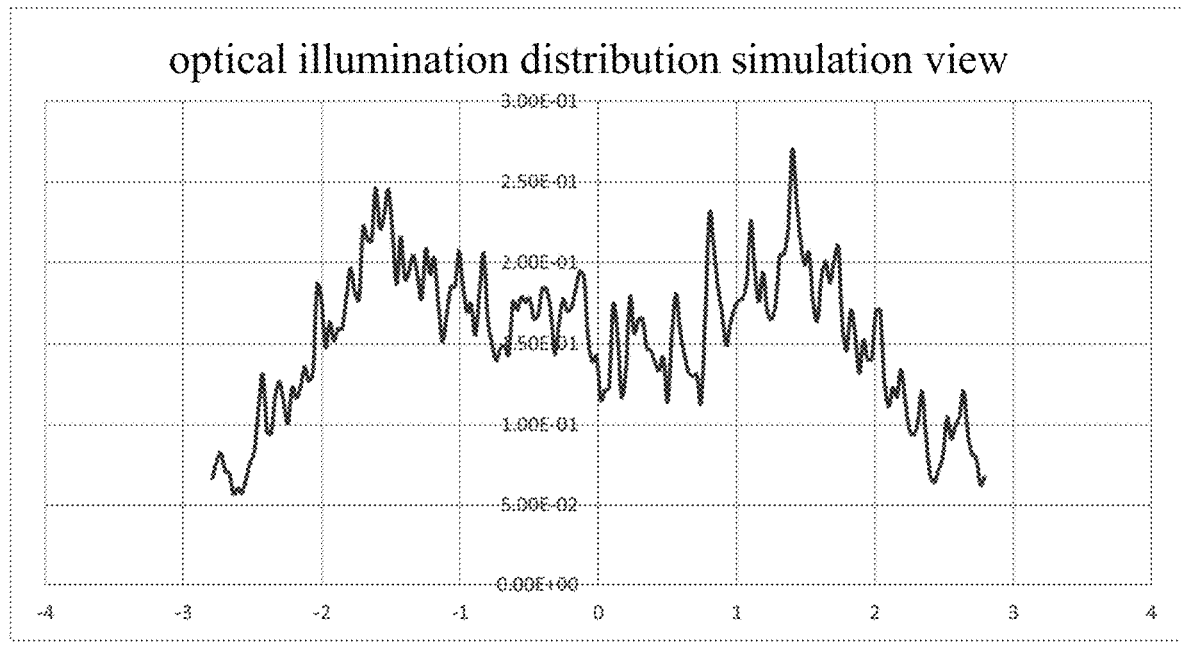
FIG. 8C illustrates a schematic optical illumination distribution simulation view of the fourth preferred embodiment of the backlight module of the present invention.

Regarding to FIG. 8A, which illustrates a schematic view of a fourth preferred embodiment of the backlight module of the present invention. A backlight module 400 of the fourth preferred embodiment adopts the prism sheet set 150 above the optical films 310. The prism sheet set 150 is disclosed in FIG. 5A, and it is not described any further hereinafter. With respect to FIG. 8B and FIG. 8C, which illustrate a schematic optical illumination distribution simulation view of the backlight module without deflective microstructures and a schematic optical illumination distribution simulation view of the fourth preferred embodiment of the backlight module of the present invention. As shown in FIG. 8B, which adopts the backlight module 400 as a basic technology to install an optical film 13' without deflective arc arched structures, as shown in FIG. 1E, to be instead of the optical film 310, so as to produce such optical illumination distribution simulation view. Compared to FIG. 7B, the light distribution is a little broader after installing the prism sheet set 150 in FIG. 8B, but it can still be seen that the light is still concentrated around the light-emitting places (between point −2 and point −1 and between point 1 and point 2 along the horizontal axis). As shown in FIG. 8C, the light distribution is more average after deflecting the cone structures 113 and the arc arched structures 317.

Figure 9A:
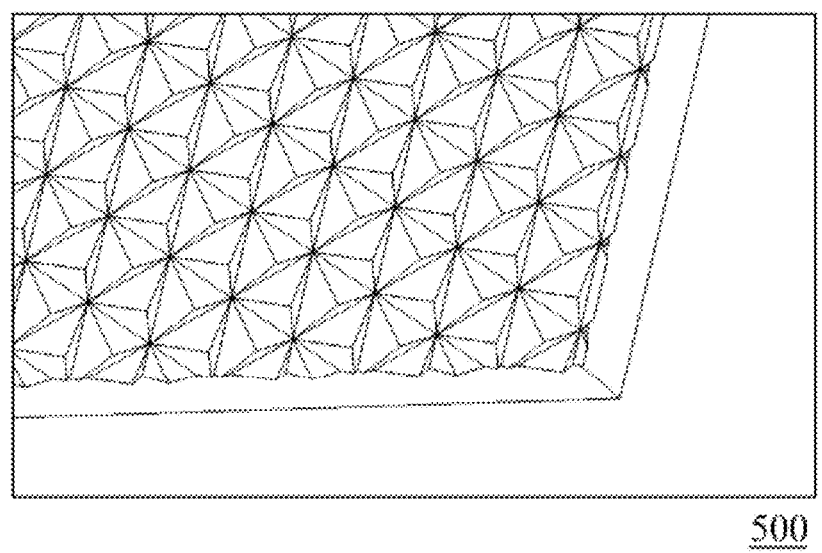
FIG. 9A and FIG. 9B illustrate two schematic partial views of another embodiment of the optical film of the present invention.
Figure 9B:
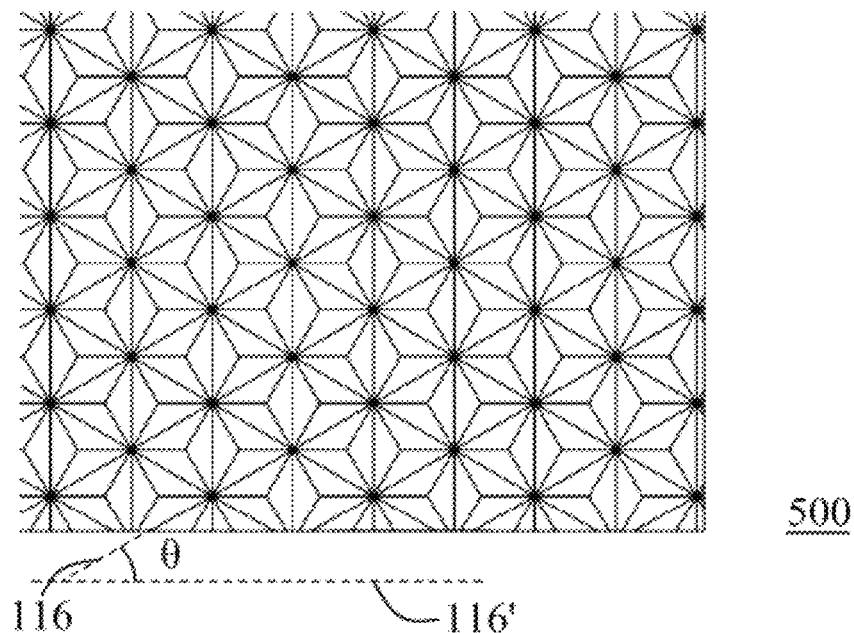
Figure 9C:
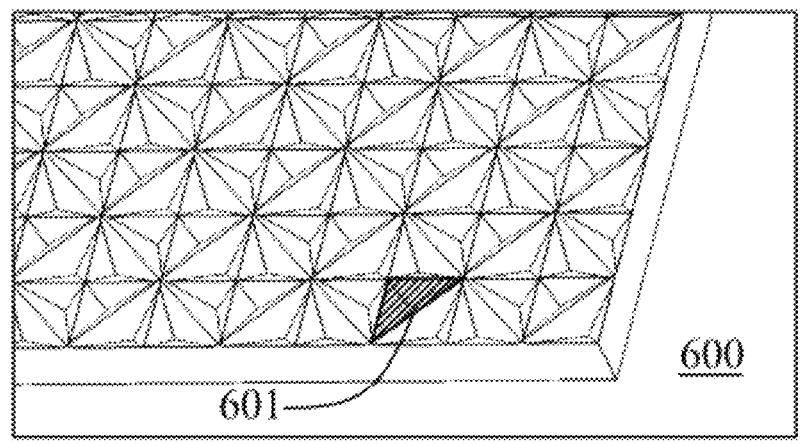
FIG. 9C and FIG. 9D illustrate two schematic partial views of another embodiment of the optical film of the present invention.
Figure 9D:
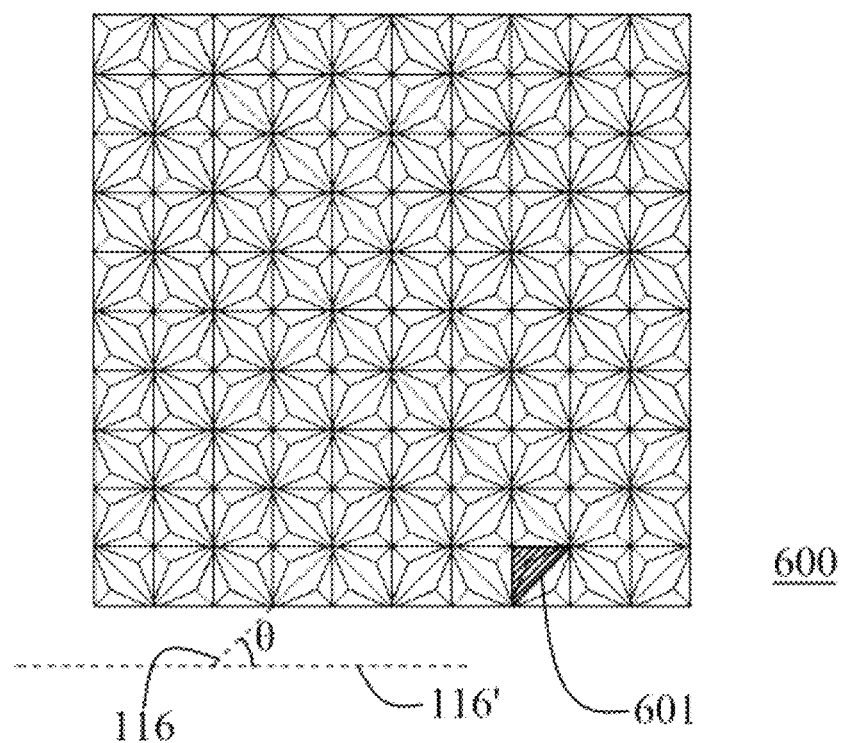

About FIG. 9A and FIG. 9B, which illustrate two schematic partial views of another embodiment of the optical film of the present invention. For FIG. 9C to FIG. 9D, which illustrate two schematic partial views of another embodiment of the optical film of the present invention as well. In the foregoing embodiment, the cone structure 113 is a quadrangular pyramid, but it is not limited to this, and the cone structure 113 may be formed by different types of cones. FIG. 9A and FIG. 9B represent the optical film 500 that is a concave equilateral triangular pyramid as the cone structure 113, and one edge of the equilateral triangular pyramid is defined as the first ridge 116, wherein the deflective angle θ is existed between the first ridge 116 and the first direction 131 formed by arranging the light-emitting elements 130.

The present invention provides the backlight module that comprises the optical film 110 and 310, wherein the optical film has the deflective cone structure 131 and the deflective arc arched structure 317, so as to effectively improve the light diffusion. As it can be seen, the light illumination is able to cover a whole area. Compared to prior arts, the present invention increases light performance, even the density of the light-emitting elements 130 is reduced, which means the cost is lower down.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:

1. A backlight module, comprising:
   a substrate;
   a plurality of light-emitting elements, disposed on the substrate along a first direction and a second direction;
   at least one optical film, comprising:
      a first surface, having a plurality of cone structures, top points of the cone structures being arranged to form a plurality of first ridges, wherein an angle θ is between the first ridge and the first direction; and
      a second surface, corresponding to the first surface and toward the substrate, the plurality of light-emitting elements being between the substrate and the second surface;
   wherein a distance X is defined between the light-emitting element and the other light-emitting element that is adjacent to the light-emitting element along the first direction, and a distance Y is defined between the light-emitting element and the other light-emitting element along the second direction, hence a range of the angle θ is as that of:

$$\left(\tan^{-1}\frac{Y}{X}\right) - 10° \leq \theta \leq \left(\tan^{-1}\frac{Y}{X}\right) + 10°;$$

wherein the second surface further comprises a plurality of arc arched structures, and the top portions of the arc arched structures are arranged to form a plurality of second ridges, the angle θ being between the second ridge and the first direction.

2. The backlight module according to claim 1, wherein the cone structure is a quadrangular pyramid recessed toward the substrate.

3. The backlight module according to claim 1, wherein the cone structure is a polygonal pyramid recessed toward the substrate.

4. The backlight module according to claim 1, wherein the light-emitting element is a Mini LED.

5. The backlight module according to claim 1, wherein a thickness of the optical film is between 0.05 to 0.5 mm.

6. The backlight module according to claim 1, wherein a material of the optical film is selected from the group consisting of: polycarbonate, polymethyl methacrylate (PMMA), and polyethylene terephthalate.

7. The backlight module according to claim 1, wherein the angle θ is defined as that of:

$$\theta = \tan^{-1}\frac{Y}{X}.$$

8. The backlight module according to claim 1 further comprises at least one prism that is above the optical film.

9. The backlight module according to claim 1, wherein the number of the optical film is multiple, the optical films are stacked vertically.

* * * * *